United States Patent
Oshima et al.

(10) Patent No.: US 8,686,657 B2
(45) Date of Patent: Apr. 1, 2014

(54) POWER SUPPLY DEVICE AND LIGHT-EMITTING ELEMENT DRIVE DEVICE

(71) Applicant: TDK Corporation, Tokyo (JP)

(72) Inventors: Kazunori Oshima, Tokyo (JP);
Hironobu Masuoka, Tokyo (JP);
Mitsuyuki Tsujisaka, Tokyo (JP)

(73) Assignee: TDK Corporation (JP)

( * ) Notice: Subject to any disclaimer, the term of this patent is extended or adjusted under 35 U.S.C. 154(b) by 48 days.

(21) Appl. No.: 13/623,498

(22) Filed: Sep. 20, 2012

(65) Prior Publication Data

US 2013/0076259 A1 Mar. 28, 2013

(30) Foreign Application Priority Data

Sep. 22, 2011 (JP) ................................. 2011-207211

(51) Int. Cl.
*H05B 37/02* (2006.01)
*H05B 33/08* (2006.01)
*H02M 3/157* (2006.01)

(52) U.S. Cl.
CPC .......... *H05B 33/0815* (2013.01); *H02M 3/157* (2013.01)
USPC ....................................... 315/209 R; 315/210

(58) Field of Classification Search
CPC ... H02M 3/156; H02M 3/157; H05B 33/0815
USPC ................. 315/209 R, 210, 209 CD; 323/283
See application file for complete search history.

(56) References Cited

U.S. PATENT DOCUMENTS

| 8,030,910 B2* | 10/2011 | Lima et al. ................... 323/282 |
| 2008/0116818 A1* | 5/2008 | Shteynberg et al. .......... 315/192 |
| 2011/0187276 A1* | 8/2011 | Shteynberg et al. .......... 315/186 |

FOREIGN PATENT DOCUMENTS

JP 09-331017 12/1997

* cited by examiner

*Primary Examiner* — Jason M Crawford
(74) *Attorney, Agent, or Firm* — Harness, Dickey & Pierce, P.L.C.

(57) ABSTRACT

A power supply device includes a convertor and an arithmetic circuit. The convertor supplies electric power by performing an ON and OFF operation of a switching element. The arithmetic circuit calculates a control command value at predetermined intervals based on a digital value, which reflects an output voltage of the convertor, from a conversion circuit. Based on the control command value, a pulse signal generation circuit determines a duty ratio of a pulse signal to make the output voltage of the convertor stable. A driving signal with a finely adjusted duty ratio can be generated by an operation clock signal having a lower frequency than a conventional device. As a result, the number of output lines is appropriate if there is at least a single output line for the pulse signal from the pulse signal generation circuit.

8 Claims, 4 Drawing Sheets

POWER SUPPLY DEVICE AND LIGHT-EMITTING ELEMENT DRIVE DEVICE

CROSS-REFERENCE TO RELATED APPLICATION

This application claims priority to Japanese Patent Application No. 2011-207211 filed Sep. 22, 2011 which is hereby expressly incorporated by reference herein in its entirety.

BACKGROUND

The present invention relates to a power supply device and a light emitting element drive device. Specifically, the power supply device and the light emitting element drive device perform pulse width modulation (PWM) control by using a microprocessor.

Japanese Patent Publication No. H09-331017 discloses a light emitting element drive device. In the disclosed light emitting element drive device, a pulse oscillator generates a driving signal with a predetermined duty ratio based on a digital signal corresponding to a calculated value that is a control command value calculated by a microprocessor as a digital circuit. When the digital signal is a 10 bit signal, a duty ratio of the driving signal is changed based on its digital value in a range of 0 through 1023.

The steps that adjust the duty ratio depend on the number of bits of the digital signal. When a duty ratio is finely adjusted, the number of bits of a digital signal increases. When the number of bits of a digital signal increases, the number of lines for the output signals from the microprocessor increases. However, the number of lines for the output signals from a microprocessor can decrease when a driving signal is generated inside the microprocessor. Therefore, the frequency of an operation clock has to be high in order to finely adjust a duty ratio.

An object of the present invention is to provide a power supply device and a light emitting element drive device in which a driving signal with a finely adjusted duty ratio can be generated by an operation clock signal having a lower frequency than the conventional device. The above features can be achieved with a simple circuit configuration and without increasing the number of lines for the output signals from a digital circuit.

SUMMARY

A power supply device according to one aspect to the present invention includes: a converter that supplies electric power by performing an ON and OFF operation of a switching element; a voltage detector that detects a voltage value of an output voltage of the converter; a conversion circuit that converts the voltage value into a digital value; an arithmetic circuit that receives an operation clock signal and that calculates a control command value based on the digital value; a pulse signal generation circuit that outputs a pulse signal of a duty ratio that is determined based on the control command value; a ramp signal generation circuit that outputs a ramp signal synchronized to a clock signal generated based on the operation clock signal; an integration circuit that receives the pulse signal and that outputs an output voltage; and a driving signal generation circuit that generates a driving signal based on a comparison result of comparing the ramp signal with the output voltage from the integration circuit. The switching element preforms the ON and OFF operation according to the driving signal.

In the power supply device according to the above aspect, the arithmetic circuit calculates a control command value at predetermined intervals based on the digital value, which reflects the output voltage of the converter, from the conversion circuit. Based on the control command value, the pulse signal generation circuit determines the duty ratio of the pulse signal so as to either increase or decrease the output voltage from the integration circuit. As a result, the output voltage of the converter becomes stable. Therefore, the number of output lines for the output signals from a digital circuit, such as a microprocessor, does not increase as compared with the above conventional technology. The number of output lines is appropriate if there is at least a single output line for the pulse signal from the digital circuit.

Also, the frequency of the driving signal generated by the driving signal generation circuit is the same as the frequency of the ramp signal. Further, the frequency of the ramp signal is synchronized with the clock signal. Therefore, not only a frequency of the clock signal but also a frequency of the driving signal can be determined in consideration of the specifications of the converter, instead of a processing time for which the arithmetic circuit calculates the control command values. On the other hand, the frequencies of the pulse signal in which a duty ratio is determined based on the control command value may be lower than the frequency of the ramp signal. Thus, when a duty ratio of the driving signal should be finely adjusted, it is not necessary to purposely increase the frequency of the operation clock signal.

As explained above, the driving signal with a finely adjusted duty ratio can be generated by an operation clock signal having a lower frequency than the conventional device. The above features can be achieved with a simple circuit configuration by adding the integration circuit and without increasing the number of output lines for the output signals from the digital circuit.

A light emitting drive device according to another aspect of the present invention includes: a converter that supplies electric power by performing an ON and OFF operation of a switching element; a light emitting element that is driven by the electric power supplied from the converter; a current detector that detects a current value of a current flowing in the light emitting element; a conversion circuit that converts the current value into a digital value; an arithmetic circuit that receives an operation clock signal and that calculates a control command value based on the digital value from the conversion circuit; a pulse signal generation circuit that outputs a pulse signal of a duty ratio that is determined based on the control command value; a ramp signal generation circuit that outputs a ramp signal synchronized to a clock signal generated based on the operation clock signal; an integrated circuit that receives the pulse signal and that outputs an output voltage; and a driving signal generation circuit that generates a driving signal based on a comparison result of comparing the ramp signal with the output voltage from the integration circuit. The switching element preforms the ON and OFF operation according to the driving signal.

In the light emitting drive device according to the above aspect, the arithmetic circuit calculates a control command value at predetermined intervals based on the digital value, which reflects the output current for the light emitting element, from the conversion circuit. Based on the control command value, the pulse signal generation circuit determines the duty ratio of the pulse signal so as to continuously increase or continuously decrease (constantly increase or decrease, or either increase or decrease) the output voltage from the integration circuit. As a result, the output current for the light emitting element becomes stable. Therefore, the number of output lines for the output signals from a digital circuit, such as a microprocessor, does not increase as compared with the above conventional technology. The number of output lines is appropriate if there is at least a single output line for the pulse signal from the digital circuit.

Also, the frequency of the driving signal generated by the driving signal generation circuit is the same as the frequency of the ramp signal. Further, the frequency of the ramp signal is synchronized with the clock signal. Therefore, not only a frequency of the clock signal but also a frequency of the driving signal can be determined in consideration of the specifications of the converter, instead of a processing time for which the arithmetic circuit calculates the control command values. On the other hand, the frequencies of the pulse signal in which a duty ratio is determined based on the control command value may be lower than the frequency of the ramp signal. Thus, when a duty ratio of the driving signal should be finely adjusted, it is not necessary to purposely increase the frequency of the operation clock signal.

As explained above, the driving signal with a finely adjusted duty ratio can be generated by the operation clock signal having a lower frequency than the conventional device. The above features can be achieved with a simple circuit configuration by adding the integration circuit and without increasing the number of output lines for the output signals from the digital circuit.

DESCRIPTION OF EXEMPLARY EMBODIMENTS

A power supply device and a light emitting drive device according to embodiments of the present invention will be explained below with reference to the drawings.

Figure 1:
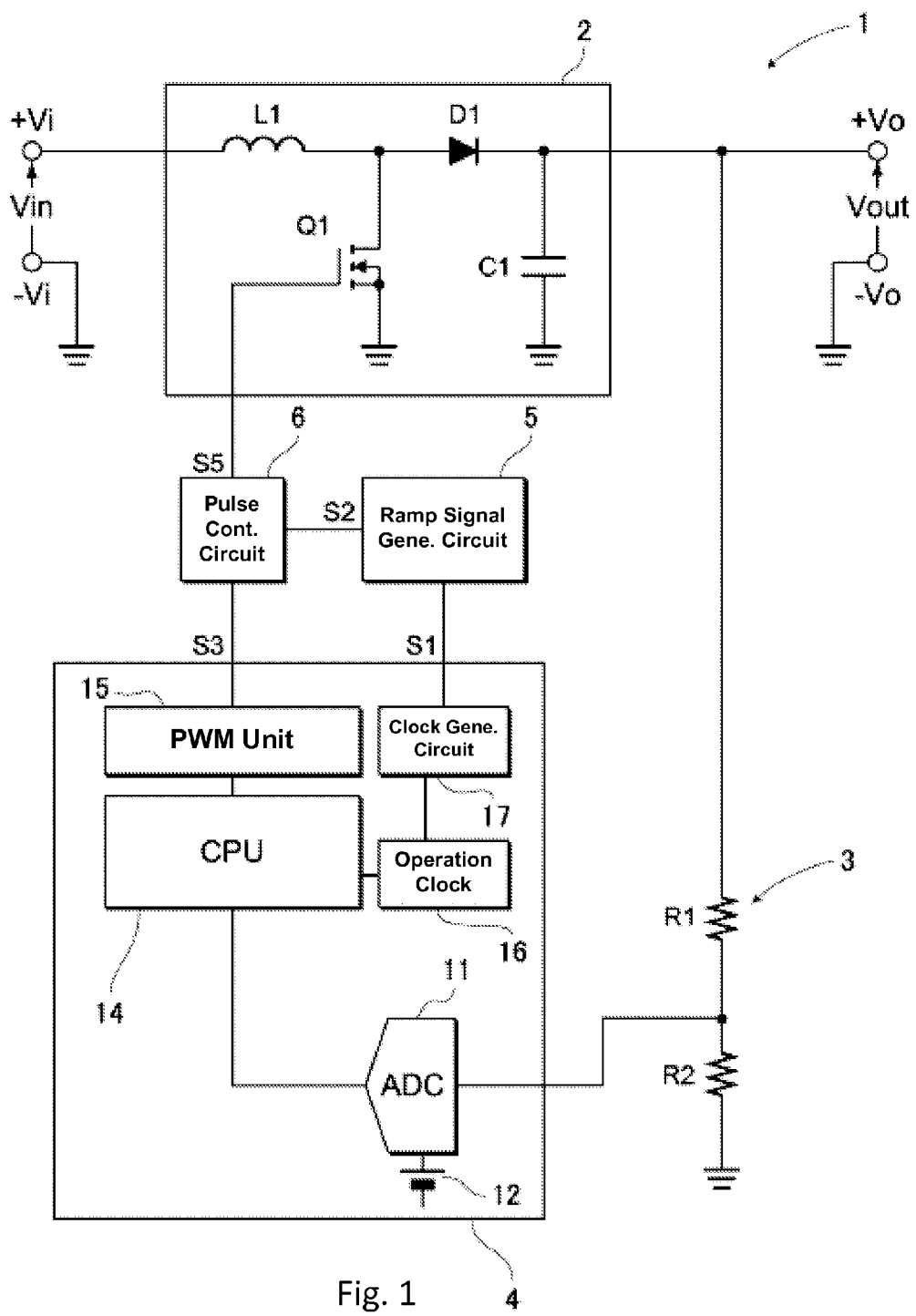
FIG. 1 is a circuit diagram of a power supply device according to a first embodiment of the present invention.

FIG. 1 shows a power supply device according to a first embodiment of the present invention. The power supply device according to the first embodiment has a configuration of a constant voltage output circuit block 1 in which an output voltage Vout is controlled as a stable voltage. The constant voltage output circuit block 1 is configured with a converter 2 that is an object to be controlled, a voltage detection circuit 3 that forms a voltage feedback loop for the converter 2, a microprocessor 4, a ramp signal generation circuit 5, and a pulse control circuit 6. Note that the converter 2 shown in FIG. 1 is a step-up type converter.

The converter 2 converts a direct current input voltage Vin, which is applied between input terminals +Vi and −Vi, to a direct current output voltage Vout and supplies the direct current output voltage Vout to output terminals +Vo and −Vo. A load (not shown) is connected between the output terminals +Vo and −Vo. The converter 2 is configured with a step-up chopper circuit in order to convert the input voltage Vin into the output voltage Vout that is higher than the input voltage Vin. The step-up chopper circuit includes a choke coil L1, a switching element Q1, a diode D1, and a capacitor C1. Specifically, a series circuit of the choke coil L1 and the switching element Q1 is connected between the input terminals +Vi and −Vi. A series circuit of the diode D1 and the capacitor C1 is connected between both terminals of the switching element Q1. The output terminals +Vo and −Vo are respectively connected to both terminals of the capacitor C1. The switching element Q1 is an N channel MOSFET (Metal Oxide Semiconductor Field Effect Transistor). However, the switching element Q1 is not limited to this and may be other semiconductor elements with a control terminal, such as a bipolar transistor.

The voltage detection circuit 3 detects the output voltage Vout from the converter 2. The voltage detection circuit 3 is configured by connecting a series circuit of resistors R1 and R2 for dividing a voltage between the output terminals +Vo and −Vo. An analog detection voltage having a voltage value that is obtained by dividing the output voltage Vout is generated at a node between the resistors R1 and R2.

The microprocessor 4 corresponding to a digital circuit calculates a control command value, which is for stabilizing the output voltage Vout, by a digital arithmetic process. The microprocessor 4 includes an analog-to-digital converter (ADC) 11, a reference power supply 12, a central processing unit (CPU) 14, a pulse width modulation (PWM) unit 15, an operation clock 16, and a clock generation circuit 17.

The ADC 11 corresponds to an analog-to-digital conversion circuit in which a voltage value (analog detection voltage) from the voltage detection circuit 3 is converted into a digital value. Further, the reference power supply 12 generates a reference voltage as a reference signal that is used when the ADC 11 converts an analog value into a digital value.

The CPU 14 corresponds to an arithmetic circuit in which a digital control command value is calculated based on a digital signal obtained by the ADC 11. Further, the PWM unit 15 corresponds to a pulse signal generation circuit that outputs a pulse signal S3 of a duty ratio that is determined based on the control command value calculated by the CPU 14 to outside the microprocessor 4.

The operation clock 16 outputs an operation clock signal that operates the CPU 14 at a predetermined cycle. Further, the clock generation circuit 17 is provided as a frequency divider in which a clock signal (synchronous clock signal) S1, which is obtained by dividing the operation clock signal from the operation clock 16, is output from the microprocessor 4. In the present embodiment, the operation clock signal of, for example, 8 MHz from the operation clock 16 is divided into a $1/16$ frequency by the clock generation circuit 17. Then, the clock signal S1 of 500 kHz is sent to the ramp signal generation circuit 5. The clock signal S1 is for determining a frequency of a driving signal S5 as discussed later.

The microprocessor 4 includes another clock generation circuit (not shown) that outputs a clock signal having a lower frequency than the clock signal S1 to the PWM unit 15 by dividing the operation clock signal from the operation clock 16. In this embodiment, an operation clock signal of, for example, 8 MHz from the operation clock 16 is divided into a $1/256$ frequency by another clock generation circuit. Then, the clock signal of 31.25 kHz is sent to the PWM unit 15. Therefore, the PWM unit 15 can send the pulse signal S3 of 31.25 kHz and of a duty ratio that is in a range of $0/256$ through $255/256$ to the pulse control circuit 6. Accordingly, the CPU 14 selects a new control command value every 256 clock cycle of an operation clock signal.

The ramp signal generation circuit 5 generates a serration-shaped or sawtooth wave signal S2 (ramp signal S2) based on a clock signal S1 from the microprocessor 4. The ramp signal S2 having the same frequency as the clock signal S1 is output to the pulse control circuit 6 from the ramp signal generation circuit 5.

Figure 2:
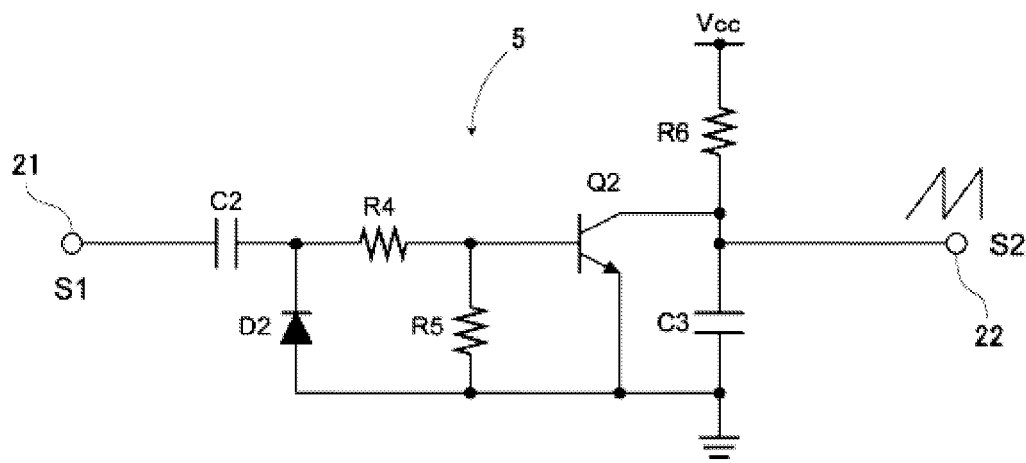
FIG. 2 is a circuit diagram of a ramp signal generation circuit of the power supply device shown in FIG. 1.

FIG. 2 is a circuit diagram of the ramp signal generation circuit 5. In FIG. 2, the ramp signal generation circuit 5 is configured with a switching element Q2, capacitors C2, C3, a diode D2, and resistors R4, R5 and R6. Specifically, one end of the capacitor C2 is connected to an input terminal 21 for the clock signal S1. Another end of the capacitor C2 is connected to a cathode of the diode D2 and to one end of the resistor R4. Another end of the resistor R4 is connected to one end of the resistor R5 and to a base of an NPN-type transistor as the switching element Q2. One end of the resistor R6 is connected to a line of an operation voltage Vcc from an internal power supply (not shown). Another end of the resistor R6 is connected to a collector of the switching element Q2 and to one end of the capacitor C3. Further, an anode of the diode D2, another end of the resistor R5, an emitter of the switching element Q2, and another end of the capacitor C3 are commonly connected to a ground line. Lastly, a collector of the switching element Q2 that is a node between the resistor R6 and the capacitor C3 is connected to an output terminal 22 for the ramp signal S2. The ramp signal generation circuit 5 is configured with the above structure.

Referring back to FIG. 1, the pulse control circuit 6 outputs a driving signal S5, which has a pulse width corresponding to a duty ratio of the pulse signal S3 from the microprocessor 4, to a gate as a control terminal of the switching element Q1 by the same cycle of the ramp signal S2 output from the ramp signal generation circuit 5.

Figure 3:
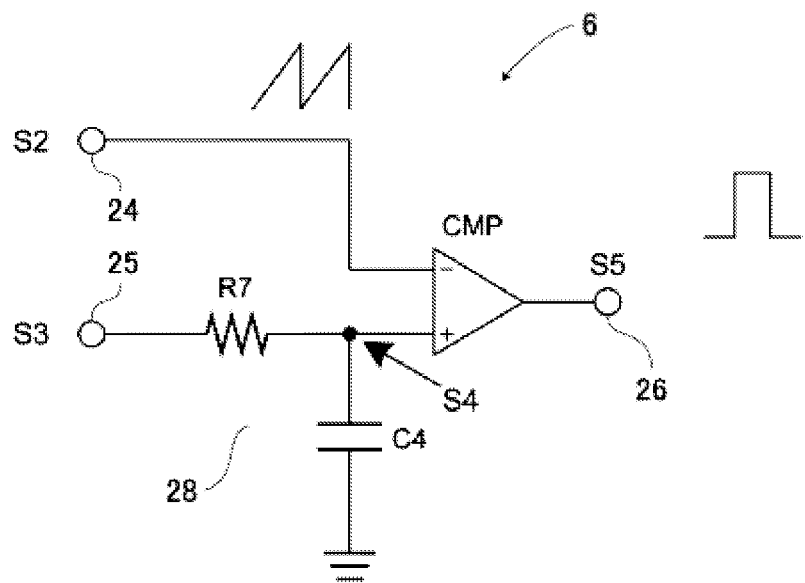
FIG. 3 is a circuit diagram of a pulse control generation circuit of the power supply device shown in FIG. 1.

FIG. 3 is a circuit diagram of the pulse control circuit 6. In FIG. 3, the pulse control circuit 6 is configured with an integration circuit 28, which is configured with a capacitor C4 and a resistor R7, and a comparator CMP. Specifically, one of the input terminals, which is an inverting input terminal, of the comparator CMP is connected to an input terminal 24 for the ramp signal S2. One end of a resistor R7 as an input end of the integration circuit 28 is connected to an input terminal 25 for the pulse signal S3. Another input terminal, which is a non-inverting input terminal, of the comparator CMP is connected to a node connected between another end of the resistor R7 as an output end of the integration circuit 28 and one end of the capacitor C4. Another end of the capacitor C4 is connected to a ground line. An output terminal of the comparator CMP is connected to an output terminal 26 for the driving signal S5. The pulse control circuit 6 is configured with the above structure.

Figure 4:
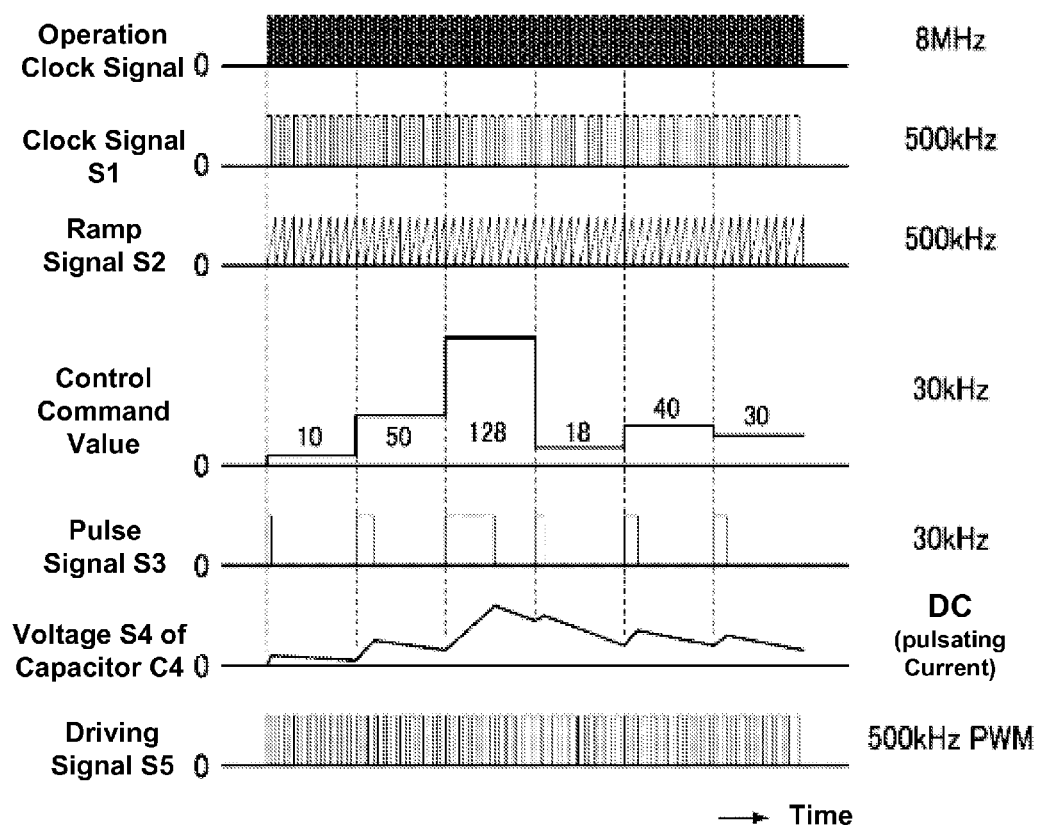
FIG. 4 is a timing diagram of each part of the power supply device shown in FIG. 1.

Next, functions of the above configuration are explained with reference to a timing diagram of each part shown in FIG. 4. In FIG. 4, the top one is the operation clock signal from the operation clock 16 followed by the clock signal S1, the ramp signal S2, the control command value generated by the CPU 14, the pulse signal S3, an end-to-end voltage S4 of the capacitor C4 (a voltage S4 between both terminals of the capacitor C4) shown in FIG. 3, and the driving signal S5.

When the pulsed driving signal S5 is input to a gate of the switching element Q1 from the pulse control circuit 6, the switching element Q1 repeats an ON and OFF operation. When the switching element Q1 is turned ON, the diode D1 is in an OFF state because an input voltage Vin is applied to a choke coil L1. Then a discharge voltage, as an output voltage Vout, of the smoothing capacitor C1 is supplied to a load from the output terminals +Vo, −Vo. When the switching element Q1 is turned OFF, the diode D1 is in an ON state because a reverse voltage of the choke coil L1 is overlapped with the input voltage Vin. Then, the output voltage Vout that is higher than the input voltage Vin is supplied to the load from the output terminals +Vo, −Vo and at the same time the capacitor C1 is charged through the diode D1.

The output voltage Vout from the converter 2 is monitored by the voltage detection circuit 3. The voltage detection circuit 3 provides an analog detection voltage that is obtained by dividing the output voltage Vout by the resistors R1, R2 to the ADC 11 of the microprocessor 4. The ADC 11 converts the analog detection voltage into a digital value by using a reference voltage from the reference power supply 12 and provides the digital value to the CPU 14.

The CPU 14 calculates a control command value based on a value of the detection voltage obtained by the voltage detection circuit 3 and the ADC 11. In this case, when the output voltage Vout becomes higher, the control command value becomes lower. In contrast, when the output voltage Vout becomes lower, the control command value becomes higher. The PWM unit 15 generates the pulse signal S3 of a duty ratio that is determined based on the control command value calculated by the CPU 14. In this case, when the control command value becomes larger, the duty ratio of the pulse signal S3 becomes larger. In contrast, when the control command value becomes smaller, the duty ratio of the pulse signal S3 becomes smaller.

A clock signal of about 30 kHz, which is obtained by dividing the operation clock signal from the operation clock 16 into a $1/256$ frequency, is input to the PWM unit 15. Thus, the PWM unit 15 generates the pulse signal S3 that has the same frequency as the clock signal. In order to achieve the above situation, the CPU 14 determines a new control command value at every frequency cycle. That frequency is the same as the pulse signal S3. In FIG. 4, the CPU 14 calculates each of the control command values, "10," "50," "128," "18," "40," and "30," in this order conforming to a frequency of the pulse signal S3. Then, the PWM unit 15 generates the pulse signal S3 of duty ratios corresponding to those control command values. The pulse signal S3 is sent to the pulse control circuit 6 from the microprocessor 4.

The microprocessor 4 provides the clock signal S1 from the clock signal generation circuit 17 to the ramp signal generation circuit 5 in addition to the pulse signal S3. The ramp signal generation circuit 5 generates the ramp signal S2 by a discharging and charging operation of the capacitor C3 shown in FIG. 2 based on the clock signal S1 from the microprocessor 4. Specifically, after the clock signal S1 at the input terminal 21 is processed with waveform shaping to change it to a trigger signal through the capacitor C2 and is divided by the resistors R4, R5, the clock signal S1 is provided to the base of the switching element Q2. When a voltage level of this trigger signal increases, the capacitor C3 is discharged by turning ON the switching element Q2 between the emitter and the collector. On the other hand, when a voltage level of this trigger signal decreases, the capacitor C3 is charged because the operation voltage Vcc is supplied to the capacitor C3 through the resistor R6 by turning OFF the switching element Q2 between the emitter and the collector. That is, after the discharge of the capacitor C3 is performed in synchronization with a rising edge of the clock signal S1, the charge of the capacitor C3 starts. Therefore, the ramp signal S2 is synchronized with the clock signal S1 from the microprocessor 4. A frequency of the ramp signal S2 can be changed by changing a frequency of the clock signal S1.

The pulse signal S3 from the PWM unit 15 discussed above is input to the integration circuit 28 of the pulse control circuit 6. The end-to-end voltage S4 of the capacitor C4, which is an output voltage of the integration circuit 28, increases and decreases in accordance with the duty ratio of the pulse signal S3. In this case, as shown in FIG. 4, the end-to-end voltage S4 depends on time constants of the resistor R7 and the capacitor C4, which configure the integration circuit 28. Thus, when the pulse signal S3 becomes an H (high)-level, the end-to-end voltage S4 increases. When the pulse signal S3 becomes an L (low)-level, the end-to-end voltage S4 decreases. As a result, the end-to-end voltage S4 constantly varies within one cycle of the fixed pulse signal S3. When the duty ratio of the pulse signal S3 becomes larger, a time for increasing the end-to-end voltage S4 becomes longer and then a time for decreasing the end-to-end voltage S4 becomes shorter after the increase. Here, because energy is required for discharging and charging the capacitor C4 of the integration circuit 28, pull-up or pull-down circuits connected to the input terminal 25 are included in the PWM unit 15. Further, a discharging and charging time of the capacitor C4 is determined based on the control command value calculated by the CPU 14. Its variable step at most should be shorter than a cycle time of the operation clock signal.

The ramp signal S2 from the ramp signal generation circuit 5 is input to the inverting input terminal of the comparator CMP of the pulse control circuit 6. The end-to-end voltage S4, which is the output voltage of the integration circuit 28, of the capacitor C4 is input to the non-inverting input terminal of the comparator CMP. The comparator CMP sends the pulse driving signal S5 with a duty ratio that is based on the comparison result between the voltage value of the ramp signal S2 and the end-to-end voltage S4 of the capacitor C4 to the gate of the switching element Q1. Therefore, the switching element Q1 performs an ON and OFF operation so as to make the output voltage Vout from the converter 2 a constant value. In the above discussed series of operations, the following configurations may be used in order to make the output voltage Vout from the converter 2 a constant value. The ADC 11 is configured to increase a digital value when a voltage value from the voltage detection circuit 3 decreases. The CPU 14 is configured to increase a control command value when the digital value from the ADC 11 increases. Alternatively, the following configurations may be used in order to make the output voltage Vout from the converter 2 a constant value. The ADC 11 is configured to decrease the digital value when the voltage value from the voltage detection circuit 3 decreases. The CPU 14 is configured to increase the control command value when the digital value from the ADC 11 decreases.

The frequency of the driving signal S5 is the same as the frequency of the ramp signal S2. A pulse width of the driving signal S5 is adjusted by the end-to-end voltage S4 of the capacitor C4. In the pulse control circuit 6 shown in FIG. 3, when the end-to-end voltage S4 of the capacitor C4 increases by comparing it with the voltage level of the ramp signal S2, the driving signal S5 having a long ON-duty ratio is generated. Thus, when the end-to-end voltage S4 of the capacitor C4 is higher, the pulse width of the driving signal S5 by which the switching element Q1 is turned ON is longer. The frequency of the pulse signal S3 that is input to the integration circuit 28 may be lower than the frequency of the ramp signal S2.

In the present embodiment, because the microprocessor 4 controls by with 8 bits, a pulse width of the pulse signal S3 varies in a range of "(0 to 255)×cycle of operation clock signal (125 nanosecond (ns))." Because the pulse signal S3 is generated based on the operation clock signal (8 MHz) form the operation clock 16, its pulse width varies in periodic stages in increments of 125 ns. The end-to-end voltage S4 of the capacitor C4 constantly increases or decreases because the pulse width of the pulse signal S3 varies. Then, this end-to-end voltage S4 and the ramp signal S2 are respectively input to the comparator CMP. Therefore, a pulse width of the driving signal S5 that is output from the comparator CMP can be constantly changed per pulse in accordance with the increase and decrease of the end-to-end voltage S4 of the capacitor C4.

A frequency (500 kHz) of the driving signal S5 is determined in consideration of a size of the choke coil L1 and a loss of switching of the switching element Q1. This is because when a frequency lowers, the size of the choke coil L1 becomes large, and when a frequency rises, the loss of switching of the switching element Q1 increases. The clock generation circuit 17 does not divide the operation clock signal in a 1/16 frequency to secure a processing time for calculating a control command value by the CPU 14. Thus, a frequency of the clock signal S1 can be determined based on a specification of the converter 2.

In the present embodiment, a frequency of the operation clock signal is, for example, 500 kHz. However, the present embodiment is not limited to the above configuration to generate the operation clock signal of 500 kHz. For example, when the operation clock 16 also has the functions of the clock generation circuit 17, a circuit configuration in which the driving signal S5 of 500 kHz remains the same can be realized. In this case, a frequency of the pulse signal S3 is 1.95 kHz (500/256=1.95 kHz). It is preferred that the CPU 14 can calculate a new control command value every 256 clock cycles with respect to the operation clock signal so that it does not depend on a frequency of the operation clock signal.

As discussed above, a power supply device according to the present embodiment includes the converter 2 that supplies electric power to a load by performing ON and OFF operations of the switching element Q1, and the microprocessor 4 as a digital circuit that calculates a control command value by a digital arithmetic process and that controls the output voltage Vout from the converter 2 to a predetermined value. The power supply device also includes the voltage detection circuit 3 as a voltage detector that detects the output voltage Vout of the converter 2. The microprocessor 4 includes: the ADC 11 as a conversion circuit that converts the voltage value of an analog detection voltage detected by the voltage detection circuit 3 into a digital value; the CPU 14 as an arithmetic circuit that receives the operation clock signal and that calculates the control command value based on the digital value from the ADC 11; and the PWM unit 15 as a pulse signal generation circuit that outputs the pulse signal S3 of a duty ratio that is determined based on the control command value calculated by the CPU 14. Further, there are other elements located outside the microprocessor 4, such as the ramp signal generation circuit 5 that outputs a serration-shaped or saw-tooth wave signal (ramp signal S2) synchronized to the clock signal S1 generated based on the operation clock signal provided to the CPU 14; the integration circuit 28 to which the pulse signal S3 is input; and the comparator CMP as a driving signal generation circuit that generates the driving signal S5, which is for performing the ON and OFF operation of the switching element Q1, based on a comparison result of comparing the ramp signal S2 with the end-to-end voltage S4 of the capacitor C4 as the output voltage of the integration circuit 28.

In the above case, the CPU 14 calculates the present control command value at predetermined intervals based on the digital value, which reflects the output voltage Vout of the converter 2, from the ADC 11. Based on the control command value, the PWM unit 15 determines the duty ratio of the pulse signal S3 so as to continuously increase or continuously decrease (constantly increase or decrease, or either increase or decrease) the end-to-end voltage S4 of the capacitor C4 as the output voltage from the integration circuit 28. As a result, the output voltage Vout of the converter 2 becomes stable.

Thus, the number of output lines is appropriate if there is at least a single output line for the pulse signal S3 from the microprocessor 4 to the integration circuit 28.

Also, the frequency of the driving signal S5 generated by the comparator CMP is the same as the frequency of the ramp signal S2. Further, the frequency of the ramp signal S2 is synchronized with the clock signal S1. Therefore, not only a frequency of the clock signal S1 but also a frequency of the driving signal S5 can be determined in consideration of the specifications of the converter 2, instead of a processing time for which the CPU 14 calculates the control command values. On the other hand, frequencies of the pulse signal S3 in which a duty ratio is determined based on the control command value may be lower than the frequency of the ramp signal S2. Thus, when a duty ratio of the driving signal S5 should be finely adjusted, it is not necessary to purposely increase the frequency of the operation clock signal.

As explained above, the driving signal S5 with a finely adjusted duty ratio can be generated by an operation clock signal having a lower frequency than the conventional device. The above features can be achieved with a simple circuit configuration by adding the integration circuit 28 and without increasing the number of output lines for the output signals from the microprocessor 4.

Figure 5:
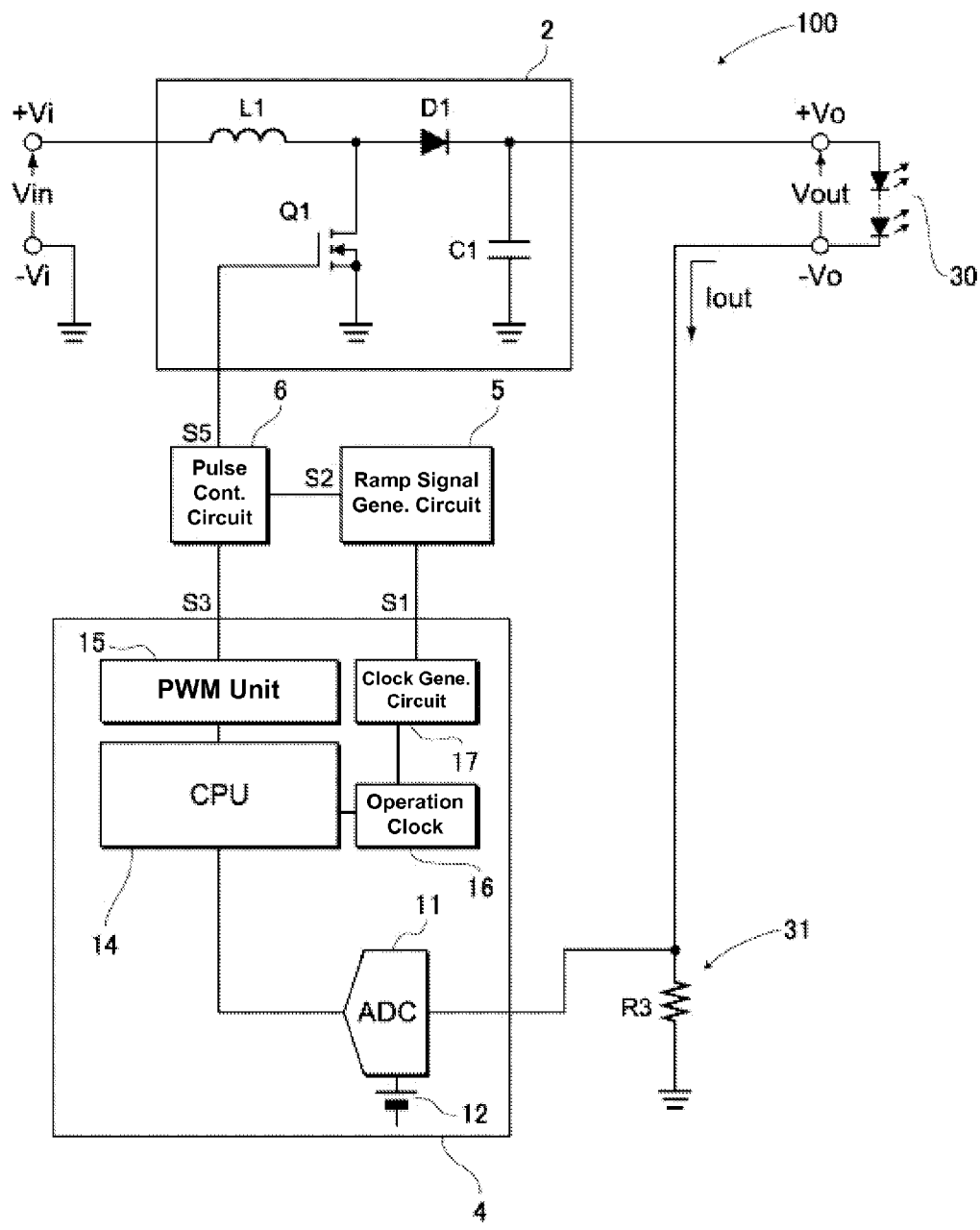
FIG. 5 is a circuit diagram of a light emitting drive device according to a second embodiment of the present invention.

Next, a second embodiment according to the present invention is explained with reference to FIG. 5. The second embodiment relates to a light emitting element drive device in which a load connected between output terminals +Vo and −Vo is one or more light emitting elements 30. The light emitting element drive device is a constant current output circuit block 100 in which an output current Iout flowing through the light emitting element 30 is controlled to a constant current. The constant current output circuit block 100 is configured with the converter 2 that is an object to be controlled, a current detection circuit 31 that forms a current feedback loop for the converter 2, the microprocessor 4, the ramp signal generation circuit 5, and the pulse control circuit 6. The configurations of the above elements shown in FIG. 5 are the same as the constant voltage output circuit block 1 according to the first embodiment except the current detection circuit 31.

The current detection circuit 31 detects the output current Iout. The current detection circuit 31 is configured by connecting a resistor R3 as a current detector between the converter 2 and the light emitting element 30. An analog detection current having a current value, which is in proportion to the output current Iout, is generated between both ends of the resistor R3. A current detector is not limited to the resistor R3. A current sensor such as a Hall-effect sensor, which has a smaller loss, may be used.

An operation of the light emitting element drive device is the same as the power supply device explained in the first embodiment although the load and the analog detection voltage are replaced with the light emitting element 30 and the analog detection current, respectively. Therefore, the operation is not explained here again.

The light emitting element drive device according to the present embodiment includes the converter 2 that supplies electric power by performing ON and OFF operations of the switching element Q1, and the microprocessor 4 as a digital circuit that calculates a control command value by a digital arithmetic process and that controls the output voltage Vout from the converter 2 to a predetermined value. Thus, the light emitting element 30 is driven by the electric power supplied from the converter 2. The light emitting element drive device also includes the current detection circuit 31 as a current detector that detects the output current Iout for the light emitting element 30. The microprocessor 4 includes: the ADC 11 as a conversion circuit that converts the current value of an analog detection current detected by the current detection circuit 31 into a digital value; the CPU 14 as an arithmetic circuit that receives the operation clock signal and that calculates the control command value based on the digital value from the ADC 11; and the PWM unit 15 as a pulse signal generation circuit that outputs the pulse signal S3 of a duty ratio that is determined based on the control command value calculated by the CPU 14. Further, there are other elements located outside the microprocessor 4, such as the ramp signal generation circuit 5 that outputs the serration-shaped or sawtooth wave signal (ramp signal S2) synchronized to the clock signal S1 generated based on the operation clock signal provided to the CPU 14; the integration circuit 28 to which the pulse signal S3 is input; and the comparator CMP as a driving signal generation circuit that generates the driving signal S5, which is for performing the ON and OFF operation of the switching element Q1, based on a comparison result of comparing the ramp signal S2 with the end-to-end voltage S4 of the capacitor C4 as the output voltage of the integration circuit 28.

In the above case, the CPU 14 calculates the control command value at predetermined intervals based on the digital value, which reflects the output current Iout for the light emitting element 30, from the ADC 11. Based on the control command value, the PWM unit 15 determines the duty ratio of the pulse signal S3 so as to continuously increase or continuously decrease (constantly increase or decrease, or either increase or decrease) the end-to-end voltage S4 of the capacitor C4 as the output voltage from the integration circuit 28. As a result, the output current Iout for the light emitting element 30 becomes stable. Thus, the number of output lines is appropriate if there is at least a single output line for the pulse signal S3 from the microprocessor 4 to the integration circuit 28.

Also, the frequency of the driving signal S5 generated by the comparator CMP is the same as the frequency of the ramp signal S2. Further, the frequency of the ramp signal S2 is synchronized with the clock signal S1. Therefore, not only a frequency of the clock signal S1 but also a frequency of the driving signal S5 can be determined in consideration of the specifications of the converter 2, instead of a processing time for which the CPU 14 calculates the control command values. On the other hand, the frequencies of the pulse signal S2 in which a duty ratio is determined based on the control command value may be lower than the frequency of the ramp signal S2. Thus, when a duty ratio of the driving signal S5 should be finely adjusted, it is not necessary to purposely increase the frequency of the operation clock signal.

As explained above, the driving signal S5 with a finely adjusted duty ratio can be generated by an operation clock signal having a lower frequency than the conventional device. The above features can be achieved with a simple circuit configuration by adding the integration circuit 28 and without increasing the number of output lines for the output signals from the microprocessor 4.

Embodiments according to the present invention have been explained. However, the present invention should not be limited to the embodiments because those embodiments are examples for explaining the present invention. Undoubtedly, several modifications may be made without departing from the spirit and scope of the invention. For example, the converter 2 is not limited to a step-up chopper circuit as shown in the drawings. The converter 2 can be a converter with any circuit configuration with one or more switching elements. So long as the output voltage Vout and the output current Iout are stable, a signal level and a logical composition of each part may be changed from the above configuration shown in the embodiments.

The power supply device and the light emitting element drive device being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A power supply device, comprising:
a converter that supplies electric power by performing an ON and OFF operation of a switching element;
a voltage detector that detects a voltage value of a first output voltage of the converter;
a conversion circuit that converts the voltage value into a digital value;
an arithmetic circuit that receives an operation clock signal and that calculates a control command value based on the digital value from the conversion circuit;
a pulse signal generation circuit that outputs a pulse signal of a duty ratio that is determined based on the control command value;
a ramp signal generation circuit that outputs a ramp signal synchronized to a clock signal generated based on the operation clock signal;
an integration circuit that receives the pulse signal and that outputs a second output voltage; and
a driving signal generation circuit that generates a driving signal based on a comparison result of the ramp signal with the second output voltage from the integration circuit, wherein
the switching element performs the ON and OFF operation according to the driving signal.

2. The power supply device according to claim 1, wherein the second output voltage from the integration circuit either increases or decreases based on the duty ratio determined based on the control command value.

3. The power supply device according to claim 2, wherein when the control command value becomes larger, the duty ratio becomes larger, and
when the control command value becomes smaller, the duty ratio becomes smaller.

4. The power supply device according to claim 1, wherein the switching element has a gate,
the driving signal has a pulse width corresponding to the duty ratio of the pulse signal, and
the driving signal is input to the gate at a cycle that is the same as a cycle of the ramp signal output from the ramp signal generation circuit.

5. A light emitting element drive device, comprising:
a converter that supplies electric power by performing an ON and OFF operation of a switching element;
a light emitting element that is driven by the electric power supplied from the converter;
a current detector that detects a current value of a current flowing in the light emitting element;
a conversion circuit that converts the current value into a digital value;
an arithmetic circuit that receives an operation clock signal and that calculates a control command value based on the digital value from the conversion circuit;
a pulse signal generation circuit that outputs a pulse signal of a duty ratio that is determined based on the control command value;
a ramp signal generation circuit that outputs a ramp signal synchronized to a clock signal generated based on the operation clock signal;
an integration circuit that receives the pulse signal and that outputs an output voltage; and
a driving signal generation circuit that generates a driving signal based on a comparison result of the ramp signal with the output voltage from the integration circuit, wherein
the switching element performs the ON and OFF operation according to the driving signal.

6. The light emitting element drive device according to claim 5, wherein
the output voltage from the integration circuit either increases or decreases based on the duty ratio determined based on the control command value.

7. The light emitting element drive device according to claim 6, wherein
when the control command value becomes larger, the duty ratio becomes larger, and
when the control command value becomes smaller, the duty ratio becomes smaller.

8. The light emitting element drive device according to claim 5, wherein
the switching element has a gate,
the driving signal has a pulse width corresponding to the duty ratio of the pulse signal, and
the driving signal is input to the gate at a cycle that is the same as a cycle of the ramp signal output from the ramp signal generation circuit.

* * * * *